US012095211B2

(12) United States Patent
Van De Sluis et al.

(10) Patent No.: US 12,095,211 B2
(45) Date of Patent: Sep. 17, 2024

(54) POWER TRACK

(71) Applicant: SIGNIFY HOLDING B.V., Eindhoven (NL)

(72) Inventors: Bartel Marinus Van De Sluis, Eindhoven (NL); Marcellinus Petrus Carolus Michael Krijn, Eindhoven (NL); Leendert Teunis Rozendaal, Valkenswaard (NL); Michel Cornelis Josephus Marie Vissenberg, Roermond (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/577,186

(22) PCT Filed: Jul. 4, 2022

(86) PCT No.: PCT/EP2022/068474
§ 371 (c)(1),
(2) Date: Jan. 5, 2024

(87) PCT Pub. No.: WO2023/280788
PCT Pub. Date: Jan. 12, 2023

(65) Prior Publication Data

US 2024/0235140 A1 Jul. 11, 2024

(30) Foreign Application Priority Data

Jul. 9, 2021 (EP) .................................... 21184634

(51) Int. Cl.
*H01R 33/945* (2006.01)
*F21V 21/02* (2006.01)
(Continued)

(52) U.S. Cl.
CPC ......... *H01R 33/945* (2013.01); *F21V 21/025* (2013.01); *F21V 21/35* (2013.01);
(Continued)

(58) Field of Classification Search
CPC ..... H01R 33/945; H01R 33/88; F21V 21/025; F21V 21/35; F21V 23/06
See application file for complete search history.

(56) References Cited

U.S. PATENT DOCUMENTS 3,963,294 A * 6/1976 Heritage ................ F21V 21/02 439/121
6,409,524 B1 6/2002 Miller et al.
(Continued)

FOREIGN PATENT DOCUMENTS

CN 108386763 A 8/2018
DE 202018106507 U1 11/2018

*Primary Examiner* — Mary Ellen Bowman

(57) ABSTRACT

The present invention relates to a power track (10) for mounting and powering an electronic product (12), the power track comprising: a mounting surface (14) comprising means (16) for surface-mounting the power track on an installation surface (18); a linear opening (20; 20') extending along at least a portion of the length (L) of the power track, the linear opening being adapted to receive a connector (22) of the electronic product to be mounted to the power track, wherein the linear opening is facing in a direction (24; 24') parallel to the mounting surface; and a linear light source (30; 30'; 46; 52).

8 Claims, 8 Drawing Sheets

(51) Int. Cl.

| | |
|---|---|
| ***F21V 21/35*** | (2006.01) |
| ***F21V 23/06*** | (2006.01) |
| ***F21Y 103/10*** | (2016.01) |
| ***F21Y 113/00*** | (2016.01) |
| ***F21Y 115/10*** | (2016.01) |
| ***H01R 13/73*** | (2006.01) |
| ***H01R 33/05*** | (2006.01) |
| ***H01R 33/88*** | (2006.01) |

(52) U.S. Cl.

CPC ............. *F21V 23/06* (2013.01); *H01R 33/88* (2013.01); *F21Y 2103/10* (2016.08); *F21Y 2113/00* (2013.01); *F21Y 2115/10* (2016.08); *H01R 13/73* (2013.01); *H01R 33/05* (2013.01)

(56) References Cited

U.S. PATENT DOCUMENTS

| | | | | |
|---|---|---|---|---|
| 8,714,991 | B2 * | 5/2014 | Kayma | H02B 1/21 361/636 |
| 2006/0012977 | A1 * | 1/2006 | Joseph | F21V 21/35 362/147 |
| 2016/0018092 | A1 * | 1/2016 | Knaapen | F21V 23/06 362/249.02 |
| 2017/0082266 | A1 | 3/2017 | Ruhland et al. | |
| 2019/0249854 | A1 | 8/2019 | Shen | |
| 2020/0326047 | A1 * | 10/2020 | De Bevilacqua | F21S 8/043 |

* cited by examiner

POWER TRACK

CROSS-REFERENCE TO PRIOR APPLICATIONS

This application is the U.S. National Phase application under 35 U.S.C. § 371 of International Application No. PCT/EP2022/068474, filed on Jul. 4, 2022, which claims the benefit of European Patent Application No. 21184634.0, filed on Jul. 9, 2021. These applications are hereby incorporated by reference herein.

FIELD OF THE INVENTION

The present invention relates to a power track for mounting and powering an electronic product, such as a spotlight. The present invention also relates to a system comprising such a power track. The present invention also relates to a method of mounting a power track to an installation surface.

BACKGROUND OF THE INVENTION

Powers track for mounting and powering spotlights are generally well known. Typically, these power tracks are mounted on a ceiling to provide spotlight illumination. Furthermore, these power tracks typically have openings where the spotlights are mounted. However, track openings usually do not provide a neat appearance.

U.S. Pat. No. 6,409,524 discloses a tracklight system including a generally U-shaped track comprising an elongated metal extrusion having a canted base extending between a first parallel leg extending at an acute angle from the base to a distal end and a second parallel leg extending at an obtuse angle from the base to a distal end. The first parallel leg has means for attaching it to a wall or ceiling, and an elongated insulator is attached to second parallel leg and extending through the track length. The insulator has a number of longitudinal slots, each including an electrical conductor receiving power from remote mains. One or more tracklight fixtures may be mounted onto or within the parallel legs. US2017082266 discloses a recessed lighting system that is capable of providing both direct and indirect lighting. The recessed lighting system may include first and second pluralities of light emitting diodes (LEDs) mounted on, respectively, first and second elongate track members. The first and second elongate track members may be spaced apart from each other by a distance, and a reflector may span at least a portion of that distance. The first and second pluralities of LEDs may be configured to emit light toward the reflector so that the reflector provides indirect lighting. A direct lighting fixture may be arranged between and slidably supported by the first and second elongate track members so that the direct lighting fixture is movable along the first and second elongate track members.

SUMMARY OF THE INVENTION

It is an object of the present invention to overcome this problem, and to provide an improved power track for mounting and powering an electronic product.

According to a first aspect of the invention, this and other objects are achieved by a power track for mounting and powering an electronic product, the power track comprising: a mounting surface comprising means for surface-mounting the power track on an installation surface; a linear opening extending along at least a portion of the length of the power track, the linear opening being adapted to receive a connector of the electronic product to be mounted to the power track, wherein the linear opening is facing in a direction parallel to the mounting surface; and a linear light source.

The linear opening facing in a direction parallel to the mounting surface may be referred to as a sideways-oriented linear opening, specifically sideways-oriented relative to the power track's mounting surface. If the present power track is mounted to a ceiling (=installation surface), the linear opening is facing sideways left or right, rather than downwards as in a conventional power track. Likewise, if the power track is mounted to a wall in a horizontal orientation, the linear opening is facing upwards or downwards. In other words, the linear opening is facing in a direction parallel to the installation surface (when the power track is mounted to the installation surface).

The means for surface-mounting the power track on an installation surface could be selected from the group comprising, but not limited to: an adhesive strip; a linear mounting strip adapted to slide over the head of one or more mounting screws inserted into the installation surface; edges for sliding or clicking or clamping into separate clips mounted to the installation surface; at least one screw hole for mounting screw(s); etc. The least one screw hole may be accompanied by at least one screwdriver hole (and plug to seal the screwdriver hole) elsewhere in the power track.

The linear light source may be integrated in the power track. In other words, the power track may comprise an integrated linear light source (as opposed to an inserted unit).

The present invention is based on the understanding that by providing the linear opening so that it is facing in a direction parallel to the mounting surface, the linear opening becomes less visible for a user at typical user positions relative to the power track. In other words, the sideways-oriented (linear) track opening avoids that a user can look into the track opening at typical user positions. For instance, if the power track is mounted on the ceiling, the user would not see the track opening at typically user positions underneath the track. The power track may also be installed at locations where it is facing away from typical user positions, for example near a wall when on the ceiling, facing upwards when on a wall above eye level, or facing downwards when on a wall if below typical eye levels. The present power track may be even less obtrusive if it has the same color as the installation surface, for example white. Furthermore, the linear light source may beneficially offer general (direct or indirect) illumination, which may be combined with accent (spot)lights (=the electronic product).

It should be noted that DE202018106507U1 discloses a busbar wherein two current conductors are arranged in what appears to be sideways-oriented slots of the busbar. At least one LED strip is also arranged in the busbar. However, the busbar in DE202018106507U1 is not surface-mounted, and the top cover of the busbar is not a mounting surface with means for surface-mounting the power track on an installation surface.

The linear light source may be arranged within the linear opening. In this way, the linear light source may be directed towards the installation surface, to generate an indirect light effect. Also, the linear light source may be out of sight from the user in typical user positions, so that the user cannot look into the linear light source, whereby discomfort glare is avoided. Preferably, the linear light source is located at a backside of a planar linear front of the power track, to more likely prevent a user to look into the linear light source. Alternatively, the linear light source could be located at the bottom of the linear opening.

A linear light source may alternatively or complementary be provided at an outer side of the power track. The linear light source may for example be provided on (or integrated in) a frontside of the aforementioned planar linear front, so that the linear light source can face downwards if the power track is mounted in a ceiling. The linear light source could here for example be a side-lit light guide. The linear light source at the frontside may be configured to lighting up the power track frontside in a light brightness and/or color which matches the generated installation surface illumination. In this way, the power track would become less obtrusive, since it would blend in with the light effect generated on the installation surface.

The power track may comprise single planar linear element projecting from said mounting surface. The single planar linear element may form a bottom of the linear opening. The single planar linear element projecting from the mounting surface enables (segments of) the power track to be flexible, enabling the track (segment) to be curved over the installation surface. Conventional power tracks typically have two parallel planar linear element projecting from the mounting surface.

The (single) planar linear element may be reflective or translucent. The latter enables the linear light source arranged within the linear opening to provide illumination of the installation surface at both sides of the track.

The linear opening may be a single linear opening of the power track facing in a direction parallel to the mounting surface, wherein the single linear opening is formed by a U-shaped cross-section of the power track.

Alternatively, the aforementioned linear opening is a first linear opening facing in a first direction parallel to the mounting surface, wherein the power track further comprises a second linear opening facing in a second direction parallel to the mounting surface, which second direction is opposite the first direction, and wherein the first and second linear openings are formed by an H-shaped cross-section of the power track. That is, the power track here has double or dual linear openings. Furthermore, the power track may here comprise (at least) two linear light sources: a first linear light source arranged within the first linear opening, and a second linear light source arranged within the second linear opening. This enables installation surface illumination on both sides of the power track, optionally creating two distinct light effects, for instance a sharp horizon light effect on the wall (=installation surface).

The linear light source may be a linear array of LED nodes (e.g. a light strip) or LED filaments. Each LED node may here be a combination of LEDs, such as RGB (Red-Green Blue) or RGBWW (Red-Green-Blue-Warm White), to enable each node to render a specific color. An LED node could also consist of a single LED. The LEDs/LED nodes/LED filaments may be individually controllable. The linear light source may comprise (linear) optics, to optimize the light distribution towards the installation surface. The power track may also comprise multiple, individually controllable linear light sources, enabling a user to generate a desired light distribution.

The power track may further comprise power track electrodes arranged within the linear opening, in order to hide the power track electrodes from the user's view. The power track electrodes may be recessed compared to the linear light source arranged within the linear opening and also positioned further from a bottom of the linear opening than the linear light source. In this way, the linear light source may be positioned above a connector (clamp) of the electronic product, whereby the connector of the mounted electronic product hardly influences the light output of the linear light source.

The electronic product is preferably a lighting product, such as a spotlight. The electronic product could also be a sensor (for example a microphone, a smoke sensor, a presence sensor, a camera, etc.), a loudspeaker, a display, a projection device, etc. Typically, the present power track allows mounting and powering of several electronic products, for example 3-10 spotlights.

According to a second aspect of the invention, there is provided a system, comprising: a power track according to the first aspect; and an electronic product mountable or mounted to the power track.

The connector of the electronic product may be at least partly translucent. In this way, the connector of the mounted electronic product hardly influences the light output of the linear light source arranged within the linear opening of the power track.

The connector of the electronic product may have a comb structure, wherein LED nodes of the linear light source arranged within the linear opening sit between teeth of the comb structure when the electronic product is mounted to the power track. In this way, the connector may avoid overlapping individual LED nodes, whereby the connector of the mounted electronic product hardly influences the light output of the linear light source arranged within the linear opening of the power track.

According to a third embodiment of the invention, there is provided a method of mounting a power track to an installation surface, which method comprises: providing a power track comprising an opening adapted to receive a connector of an electronic product to be mounted to the power track; and surface-mounting the power track on the installation surface such that the opening is facing in a direction parallel to the installation surface. This aspect may exhibit the same or similar features and technical effect as the first and/or second aspects, and vice versa.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions may be exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1A:
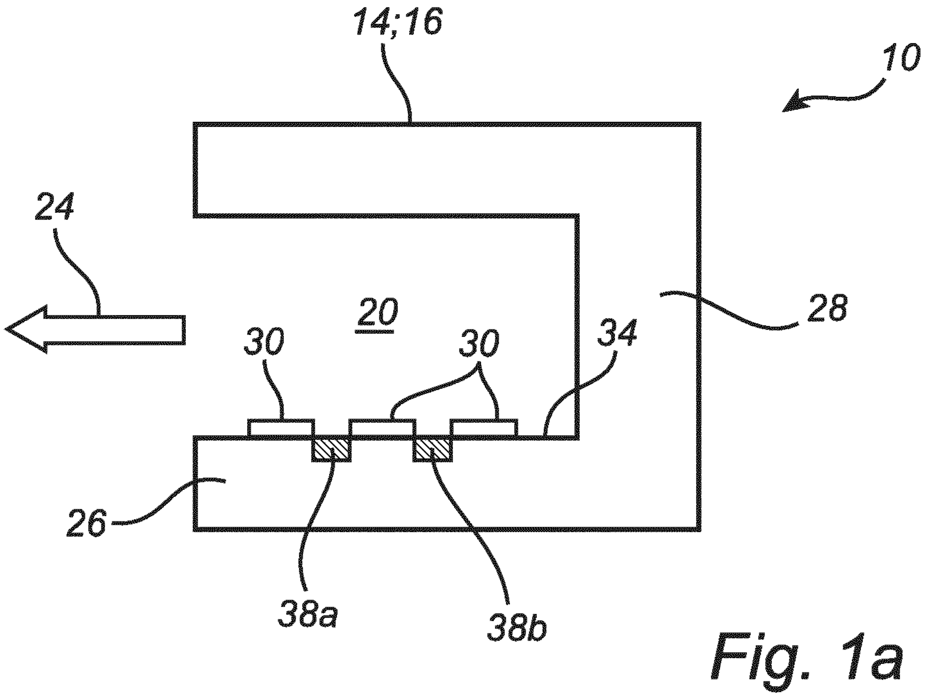
FIG. 1*a* is a schematic cross-sectional view of a power track according to an embodiment of the present invention.
Figure 1B:
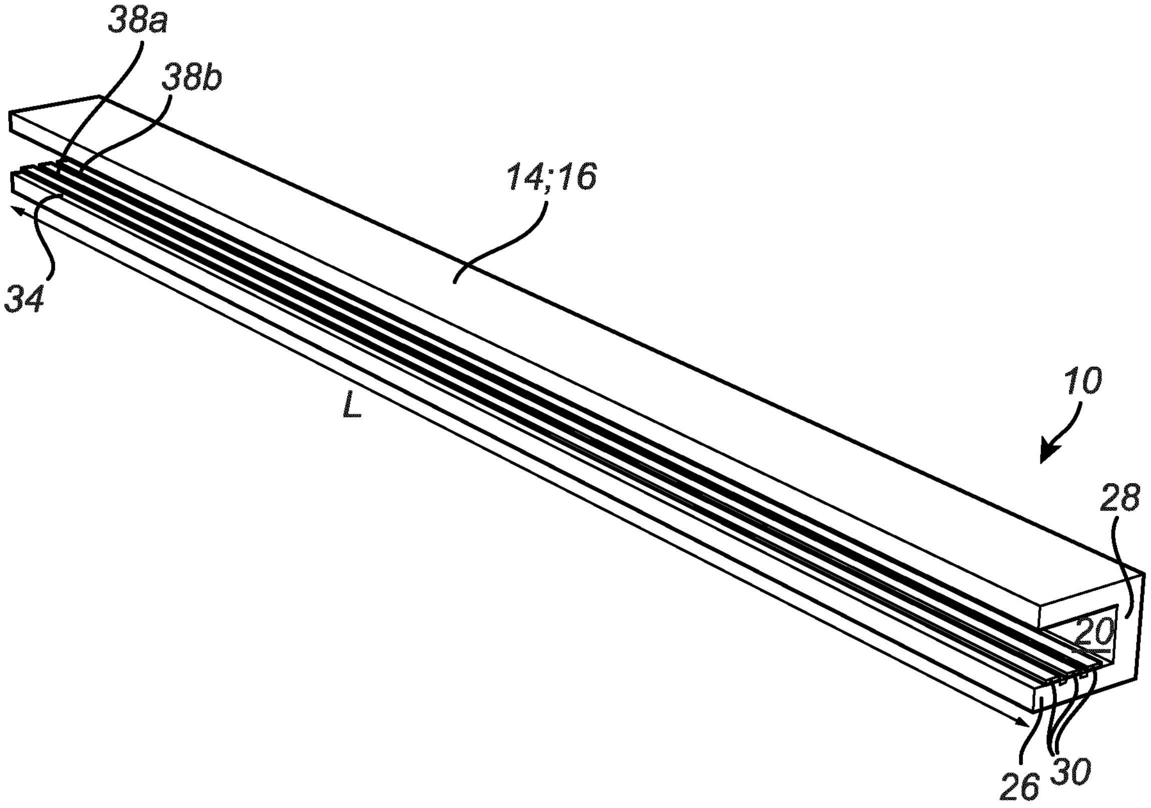
FIG. 1*b* is a perspective view of the power track of FIG. 1*a*.
Figure 1C:
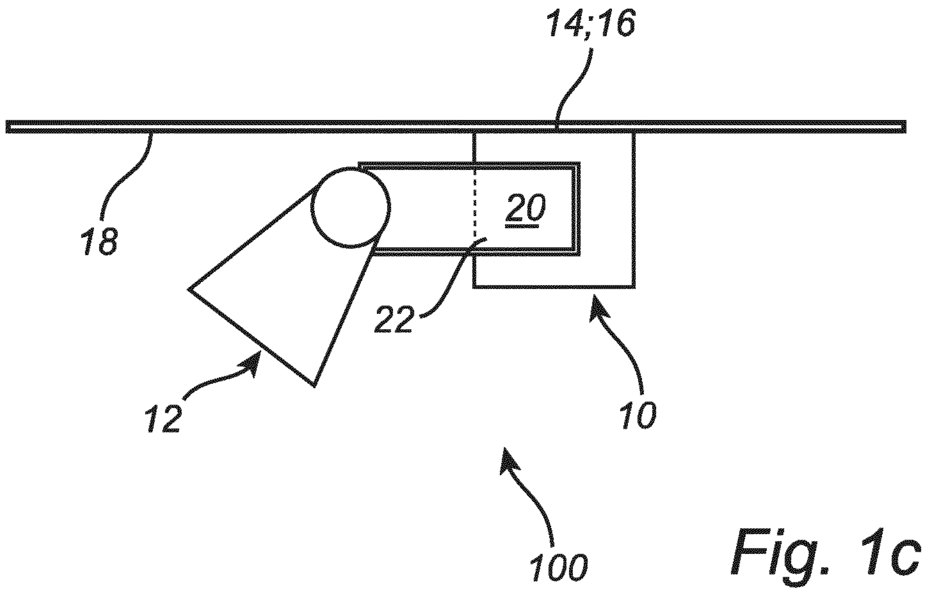
FIG. 1*c* illustrates the power track of FIG. 1*a* mounted in a ceiling and with a spotlight mounted to the power track.

FIGS. 1*a-b* illustrate a power track 10 according to an embodiment of the present invention. The power track 10 may be used for mounting and powering at least one electronic product 12, such as a lighting product (e.g. a spotlight), as shown in FIG. 1*c*. The power track 10 and the at least one electronic product 12 mountable or mounted to the power track 10 may be referred to as a system 100. The power track 10 will typically be used to mount and power 2-20, preferably 3-10, electronic products 12. That is, the system 100 will typically comprise 2-20, preferably 3-10, electronic products 12.

The power track 10 comprises a mounting surface 14. The mounting surface 14 may be a top mounting surface, as in FIGS. 1*a-c*. The mounting surface 14 of the power track 10 may be flat or at least comprise one or more flat portions, so that the power track 10 can be stably mounted on an installation surface 18. The mounting surface 14 may comprise means 16 for surface-mounting the power track 10 on the installation surface 18. Various exemplary means 16 are shown in FIGS. 5*a-f* and will be discussed further hereinbelow. The power track 10 further comprises a linear opening 20. The linear opening 20 preferably extends along (substantially) the complete length L of the power track 10. The power track 10 may for example have a length L in the range of 1-10 meters. The linear opening 20 is adapted to receive a connector 22 of the electronic product 12 to be mounted to the power track 10. That is, the connector 22 mechanically and electrically connects the electronic product 12 to (the linear opening 20 of) the power track 10.

Figure 1D:
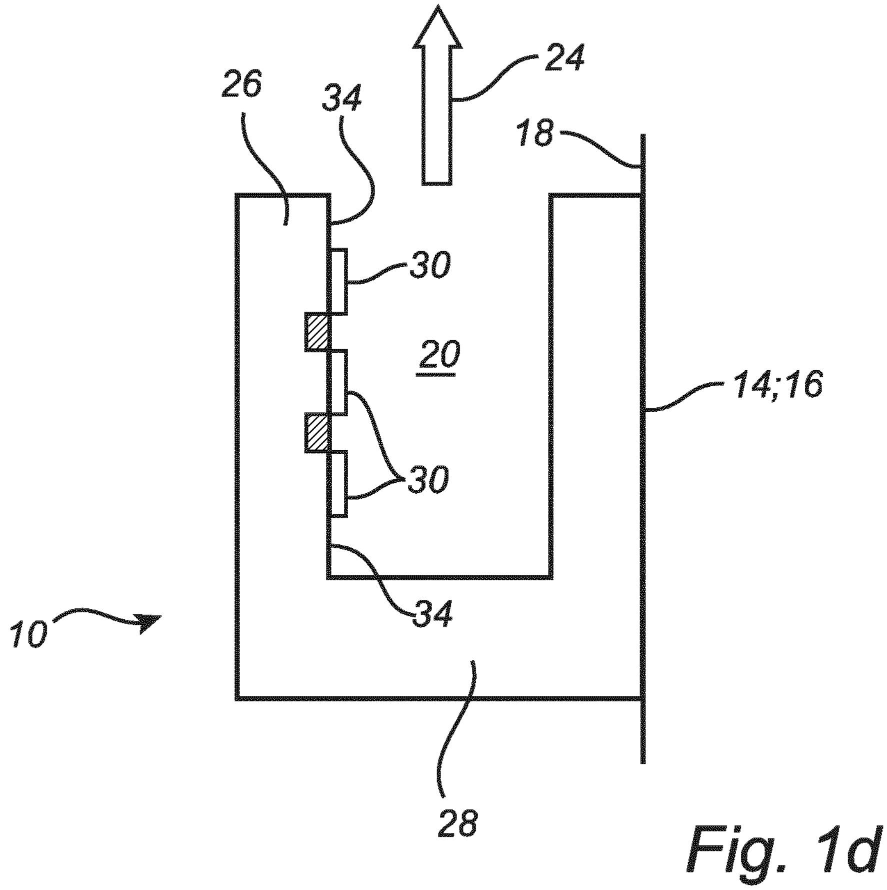
FIG. 1*d* illustrates the power track of FIG. 1*a* mounted to a wall.

The linear opening 20 is facing in a direction 24 parallel to the mounting surface 14 (and parallel to the installation surface 18). Accordingly, the linear opening 20 could be referred to as a sideways-oriented opening 20. In FIG. 1*c*, the power track 10 is mounted to a ceiling (=installation surface 18), and the linear opening 20 is facing to the left. In FIG. 1*d*, the power track 10 is mounted to a wall (=installation surface 18), and the linear opening 20 is facing upwards. In both instances, the linear opening may become less visible for a user at typical user positions relative to the power track 10.

In FIGS. 1*a-e*, the power track 10 has a single linear opening 20. The single linear opening 20 may be formed by a U-shaped cross-section of the power track 10. This cross-section of the power track 10 may comprise the aforementioned mounting surface 14, a planar linear front 26 opposite and parallel to the mounting surface 14, and a single planar linear element 28 projecting from one end of the mounting surface 14 to a corresponding end of the planar linear front 26.

The power track further comprises at least one linear light source 30. The at least one linear light source 30 may extend along (substantially) the complete length L of the power track 10. The linear light source 30 may be a linear array of LED (light emitting diode) nodes 32 or LED filaments. Each LED node 32 may be a combination of LEDs, such as RGB or RGBWW, to enable each node to render a specific color. An LED node 32 could also consist of a single LED. The linear light source 30 may offer general illumination, which may be combined with accent spotlights 12.

Figure 1E:
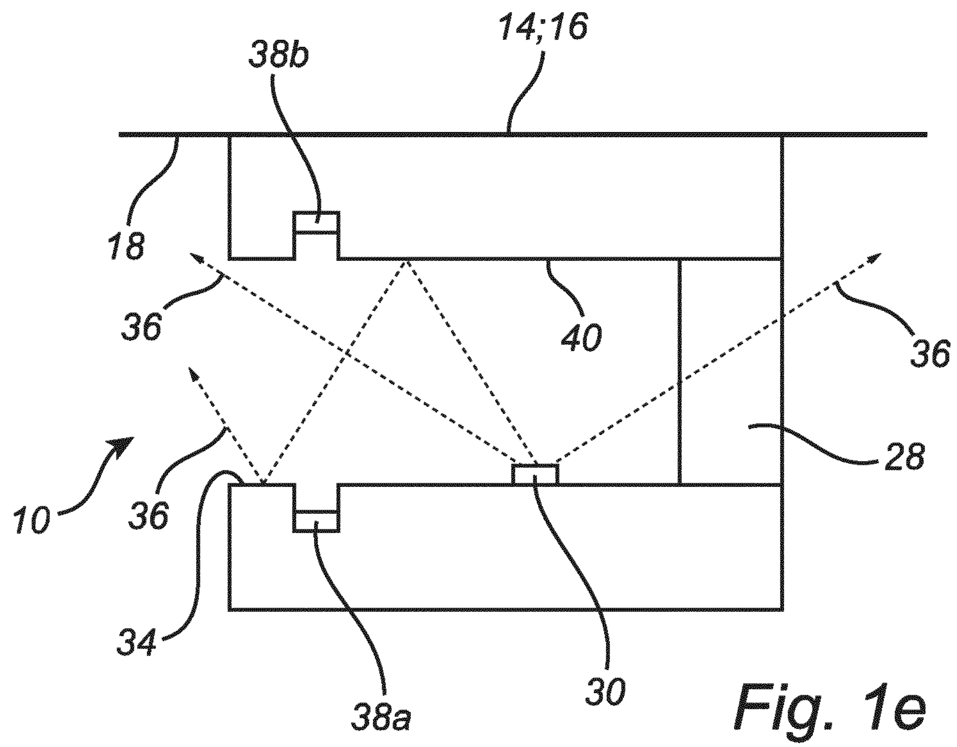
FIG. 1*e* illustrates a variant of the power track of FIG. 1*a*.

As shown for example in FIGS. 1*a-e*, the at least one linear light source 30 may be arranged within the linear opening 20. Specifically, the at least one linear light source 30 may be located at a backside 34 of the aforementioned planar linear front 26 of the power track 10. This integrated at least one linear light source 30 may be adapted to illuminate the installation surface 18. The inside of the linear opening 20 may be reflective (and diffusive). However, the planar linear element 28 of the power track 10 could be translucent (FIG. 1*e*). This enables the linear light source 30 to provide illumination of the installation surface 18 at both sides of the power track 10, as illustrated by arrows 36. 'Translucent' may be construed as permitting the passage of light, for example transparent.

The power track 10 may comprise two (power track) electrodes 38*a-b* for powering the electronic product(s) 12 mounted to the power track 10. The electrodes 38*a-b* could also power the at least one integrated linear light source 30. The power tracks 38*a-b* may be arranged within the linear opening 20. In FIGS. 1*a-d*, the electrodes 38*a-b* are located at the backside 34 of the planar linear front 26, to hide them from the user's view. Specifically, the electrodes 38*a-b* are here located in between three linear light sources 30. Alternatively, one electrode 38*a* could be located at the backside 34 of the planar linear front 26, whereas the other electrode 38*b* is located at the opposite side 40 of the opening 20, as shown in FIG. 1*e*.

In FIGS. 1*a-e*, the connector 22 of the electronic product 12 may be at least partly translucent, to minimize it influence on the light output (e.g. 36) of the at least one linear light source 30, even if the electronic product 12 is positioned in front of the linear light source 30. In particular, at least one part or portion of the connector 22 used for mechanically connecting the electronic product 12 to the power track 10 could be made for example of transparent plastics.

Figure 2A:
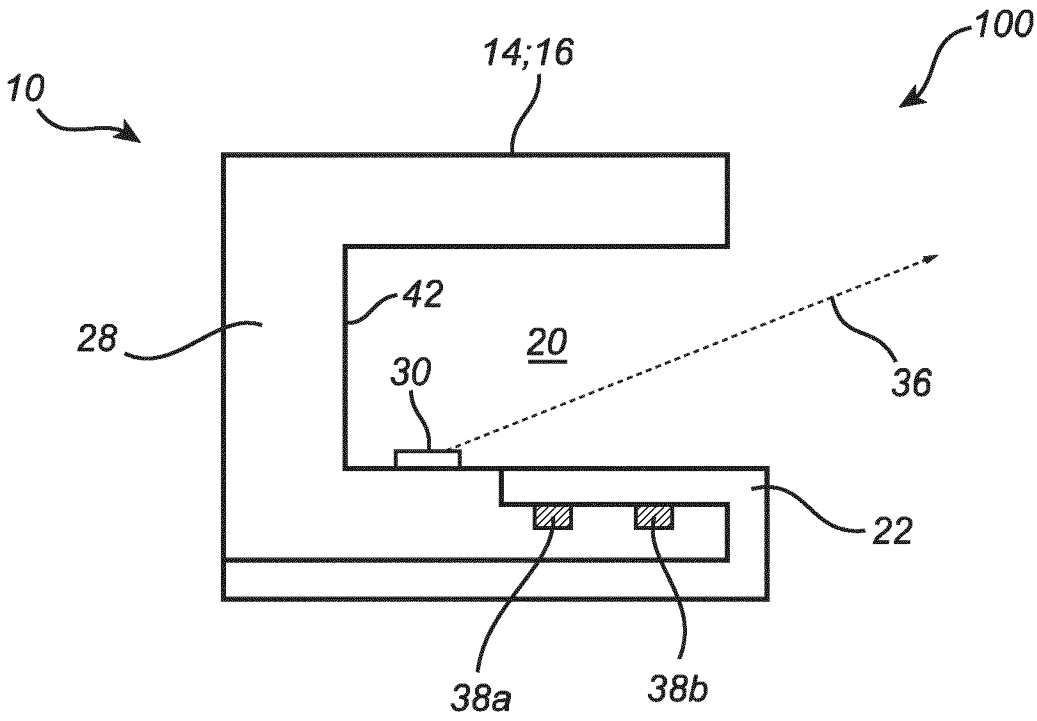
FIGS. 2*a-b* illustrate variants of the present invention.

In a variant shown in FIG. 2*a*, the at least one linear light source 30 and the electrodes 38*a-b* are (again) arranged within the linear opening 20 behind the planar linear front 26, but the electrodes 38*a-b* are recessed compared to the at least one linear light source 30. Furthermore, the electrodes 38*a-b* are positioned further from a bottom 42 of the linear opening 20 than the at least one linear light source 30, which bottom 42 is defined by the aforementioned planar linear element 28. Also, the connector 22 is or comprises a clamp clamping partly around the planar linear front 26 including the recessed electrodes 38*a-b* (but not the at least one linear light source 30 placed further in), such that at least one linear light source 30 is positioned above the connector 22. In this way, the connector 22 hardly influences the light output 36 of the linear light source 30.

Figure 2B:
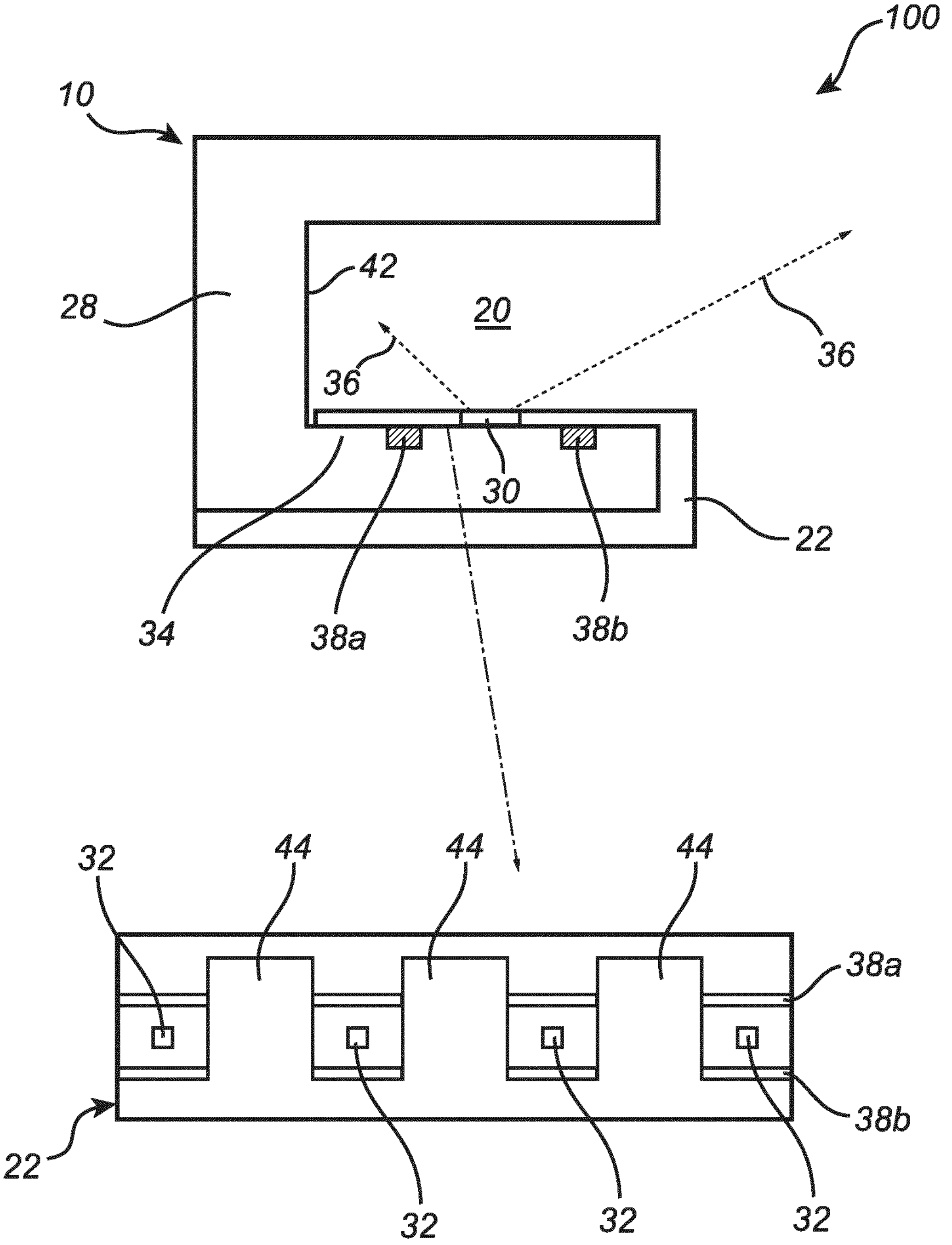

In another variant shown in FIG. 2*b*, the at least one linear light source 30 and the electrodes 38*a-b* are (again) arranged within the linear opening 20 behind the planar linear front 26, but the clamp of the connector 22 has a comb structure, wherein LED nodes 32 of the linear light source 30 sit between teeth 44 of the comb structure adapted to abut the back surface 34 when the electronic product 12 is mounted to the power track 10. In this way, the connector 22 hardly influences the light output 36 of the linear light source 30.

Figure 3A:
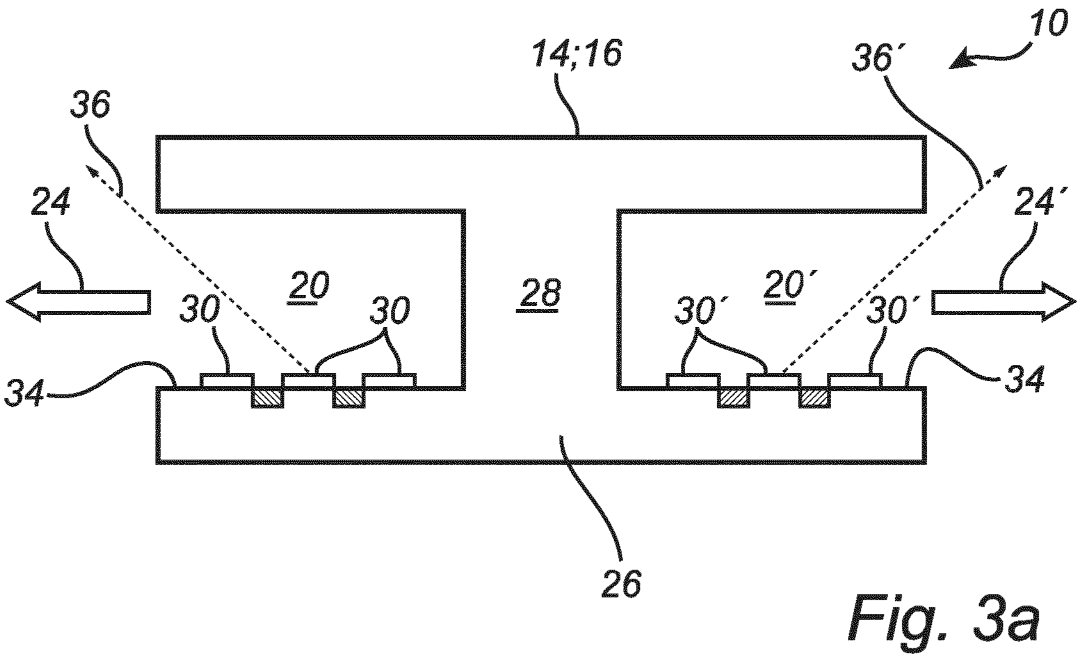
FIG. 3*a* is a schematic cross-sectional view of a power track according to another embodiment of the present invention with dual openings.
Figure 3B:
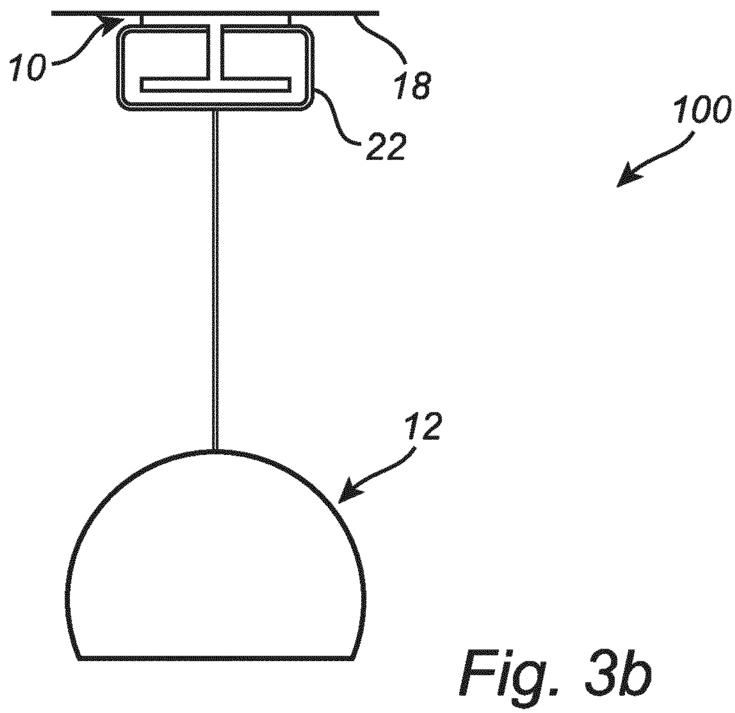
FIG. 3*b* illustrates the power track of FIG. 3*a* mounted in a ceiling and with a pendant lamp mounted to the power track.

FIGS. 3*a-b* illustrate a power track 10 according to another embodiment of the present invention. The power track 10 in FIGS. 3*a-b* may be similar to the previous described power track, but has double or dual (i.e. two) linear openings. Namely, the power track 10 in FIGS. 3*a-b* comprises a first linear opening 20 facing in a first direction 24 parallel to the mounting surface 14, and a corresponding second linear opening 20' facing in a second direction 24' parallel to the mounting surface 14, which second direction 24' is opposite the first direction 24. The first and second linear openings 20, 20' may be formed by an H-shaped cross-section of the power track 10. This cross-section of the power track 10 may include the aforementioned mounting surface 14, the planar linear front 26 opposite and parallel to the mounting surface 14, and a single central planar linear element 28 projecting from the mounting surface 14 to the planar linear front 26. The H-shaped power track 10 may enable strong mechanical support for heavy lamps 12, for example a pendant lamp as shown in FIG. 3*b*. The connector 22 may here be adapted to be attached to the H-shaped power track 10 by retracting or rotating (part of) the connector 22.

The H-shaped power track 10 may comprise two or more linear light sources: at least one first linear light source 30 arranged within the first linear opening 20, and at least one second linear light source 30' arranged within the second linear opening 20'. The linear light sources 30 and 30' may be located at the backside 34 of the common planar linear front 26. The linear light sources 30 and 30' enable illumination of the installation surface 18 on both sides of the power track 10, as illustrated by 36 and 36', optionally creating two distinct light effects. The second linear opening 20' may also comprise (power track) electrodes 40*a'* and 40*b'*.

Figure 4A:
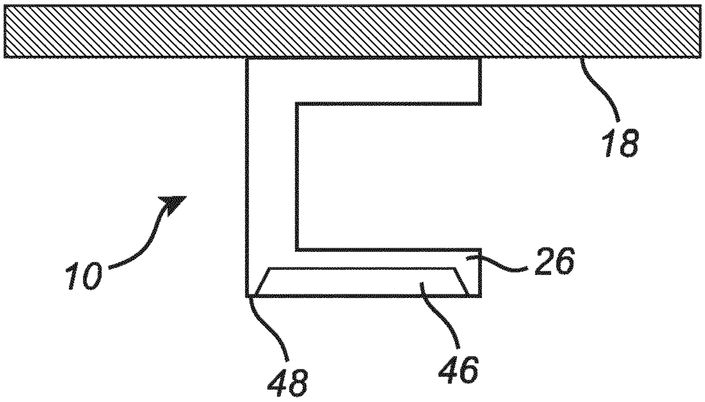
FIGS. 4*a-b* illustrate other embodiments of the present invention.
Figure 4B:
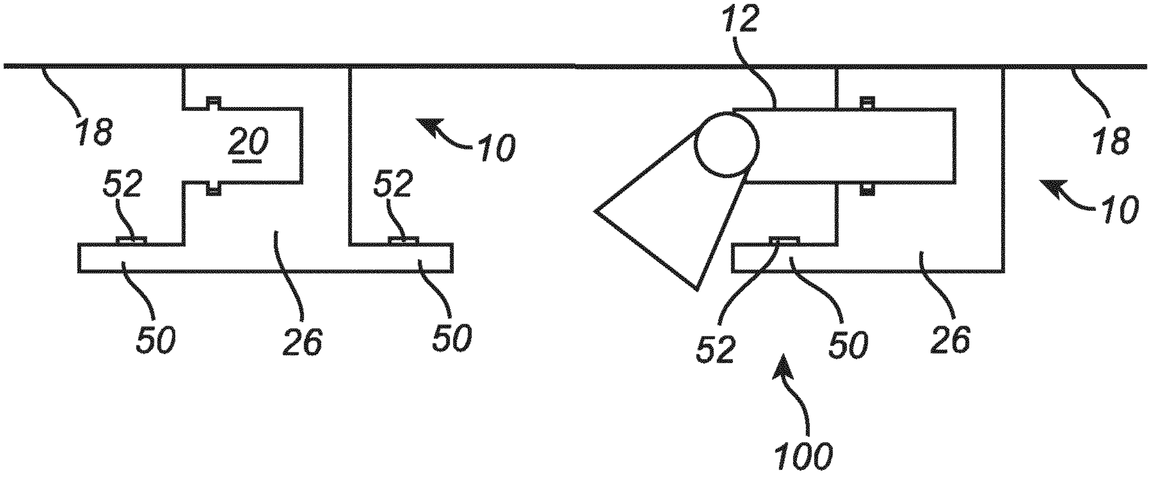

FIGS. 4*a-b* illustrate other embodiments of the present invention.

In FIG. 4*a*, the power track 10 comprises a linear light source 46 be provided on, or integrated in, an outer side of the power track 10. The linear light source 46 may be provided instead of, or in addition to, the aforementioned linear light source 30, 30'. Specifically, the linear light source 46 is in FIG. 4*a* provided at a frontside 48 of the planar linear front 26 of the power track 10. In this way, the "external" linear light source 46 can face downwards if the power track 10 is mounted in a ceiling 18.

In FIG. 4*b*, the planar linear front 26 of the power track 10 comprises a lateral extension 50 on one or both sides of the power track 10. A linear light source 52 may be provided on/behind the lateral extension 50, rather than in the linear opening 20. Accordingly, the linear light source(s) 52 may face the installation surface 18. That is, the linear light source 46 can face upwards if the power track 10 is mounted in a ceiling 18. The lateral extension 50 may also hide part of the electronic product 12, see FIG. 4*b* (right).

FIGS. 5*a-f* illustrate different means 16 for surface-mounting the power track 10 on the installation surface 18.

Figure 5C:
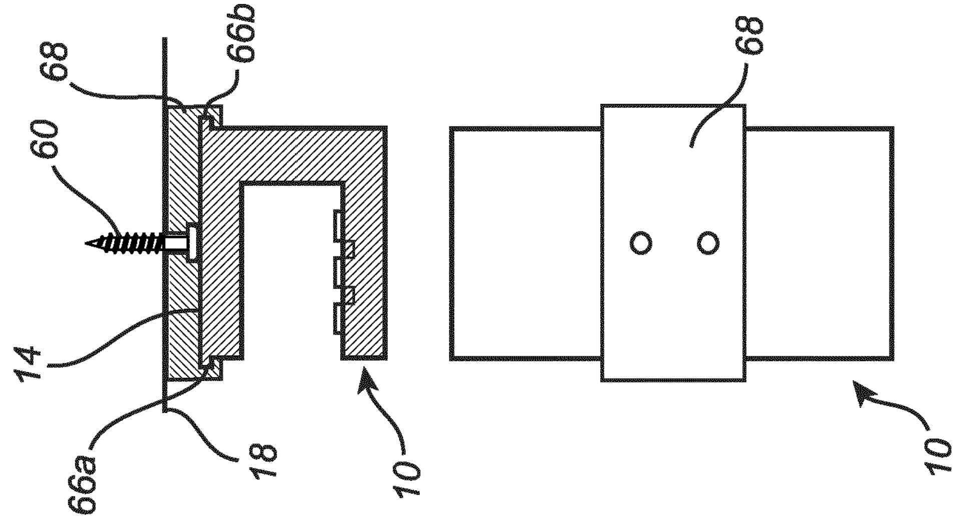
FIGS. 5*a-f* illustrate different means for surface-mounting the power track on an installation surface.
Figure 5B:
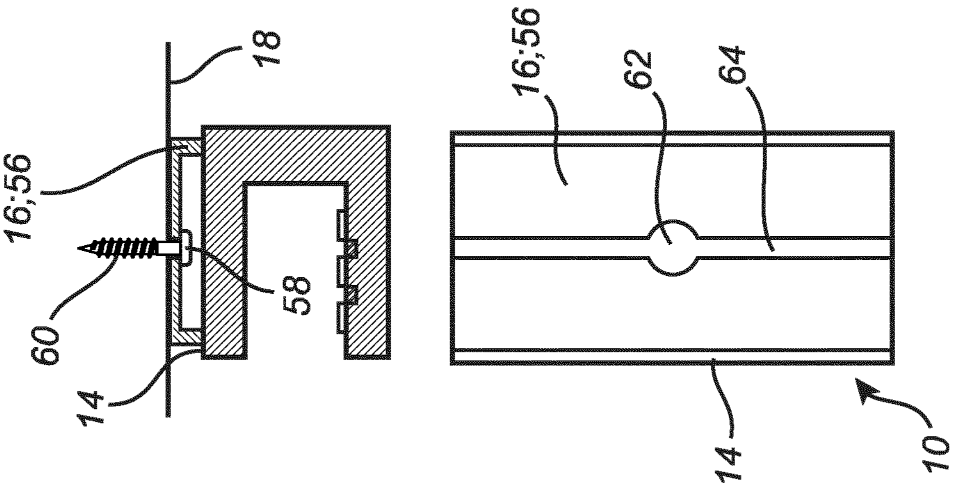
Figure 5A:
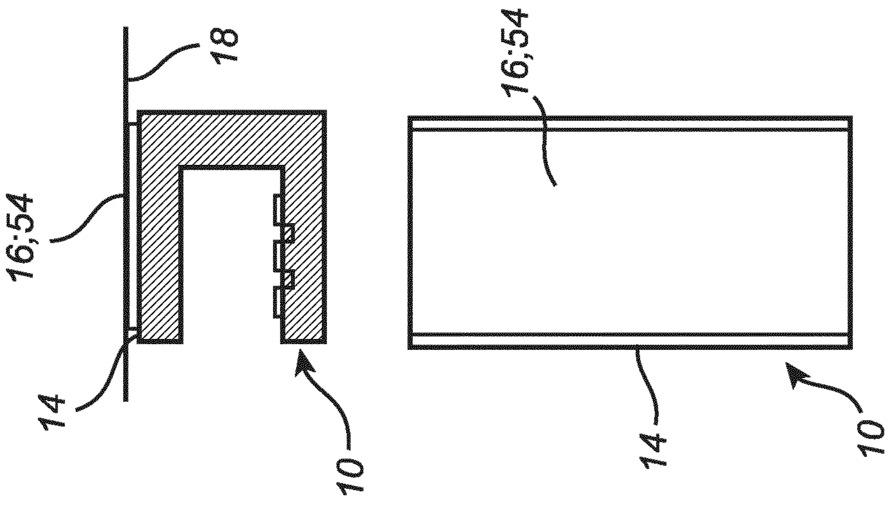

In FIG. 5*a*, means 16 comprises an adhesive strip 54 on the mounting surface 14. The adhesive strip 54 could extend along (substantially) the complete length of the power track 10, or consist of several adhesive sub-strips distributed along the length of the power track 10. The adhesive strip 54 is in particular suitable for light-weight track and electronic products.

In FIG. 5*b*, means 16 comprises a linear mounting strip 56 provided on the mounting surface 14. The linear mounting strip 56 is adapted to slide over the head 58 of one or more mounting screws 60 inserted into the installation surface 18.

The linear mounting strip 56 may have on opening 62 through with the head 58 can pass, and a narrower channel 64 locking the power track 10 to the mounting screws 60 when the power track 10 subsequently is moved in the longitudinal direction.

In FIG. 5*c*, said means comprises linear edges 66*a-b* on both sides of the mounting surface 14, for sliding or clicking or clamping the power track 10 into separate clips 68 mounted to the installation surface 18.

Figure 5F:
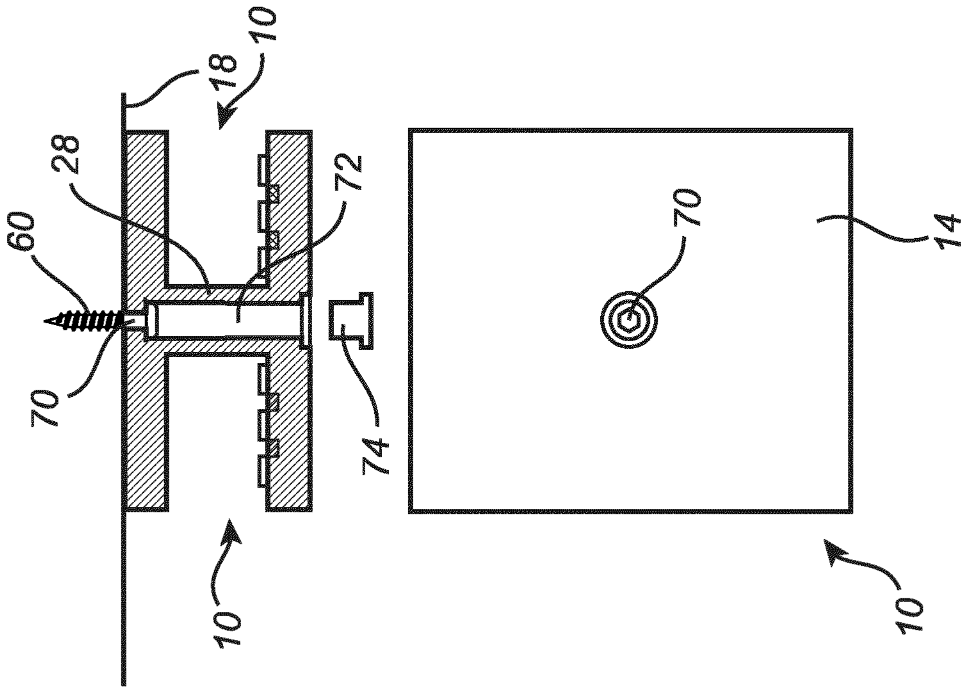
Figure 5E:
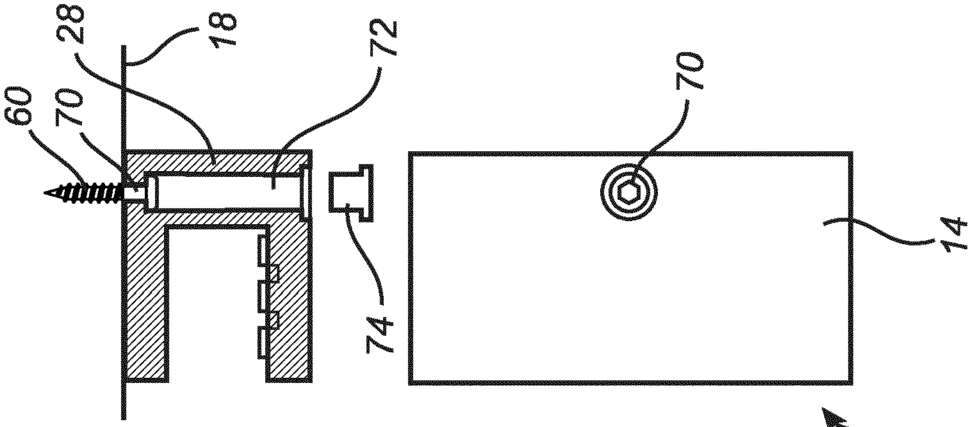
Figure 5D:
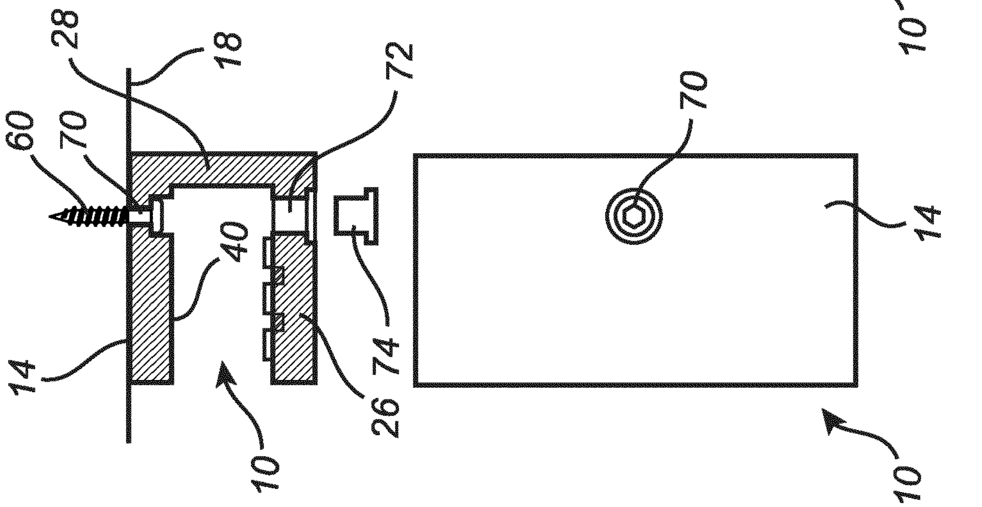

In FIG. 5*d*, said means comprises at least one screw hole 70 from the mounting surface 14 to surface 40. Also, at least one (wider) screwdriver hole 72 is provided through the planar linear front 26, which at least one screwdriver hole 72 is aligned with the least one screw hole 70. At least one plug 74 may be provided to seal the at least one screwdriver hole 72 after mounting of the power track 10 on the installation surface 18.

In FIGS. 5*e-f*, the at least one screw hole 70 and the at least one screwdriver hole 72 are provided in the planar linear element 28.

The person skilled in the art realizes that the present invention by no means is limited to the preferred embodiments described above. On the contrary, many modifications and variations are possible within the scope of the appended claims. For example, instead of or in addition to one or more lighting products, at least one other electronic product could be mounted to and powered by the present power track, for example a sensor, a loudspeaker, a display, a projection device, etc.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A system comprising a power track and an electronic product, the power track being for mounting and powering the electronic product, and the electronic product being mountable or mounted to the power track, wherein the power track comprises:

a mounting surface comprising means for surface-mounting the power track on an installation surface;

a linear opening extending along at least a portion of the length of the power track, the linear opening being adapted to receive a connector of the electronic product, and the linear opening facing in a direction parallel to the mounting surface; and a linear light source having LED nodes arranged within the linear opening, wherein the connector of the electronic product has a comb structure allowing the LED nodes to sit between teeth of the comb structure when the electronic product is mounted to the power track.

2. A system according to claim 1, wherein the power track comprises a planar linear front opposite said mounting surface, and wherein the linear light source is located at a backside of said planar linear front.

3. A system according to claim 1, wherein the power track comprises a single planar linear element projecting from said mounting surface and forming a bottom of the linear opening.

4. A system according to claim 3, wherein said planar linear element is reflective or translucent.

5. A system according to claim 1, wherein the linear opening is a single linear opening of the power track facing in a direction parallel to the mounting surface, and wherein the single linear opening is formed by a U-shaped cross-section of the power track.

6. A system according to claim 1, wherein said linear opening is a first linear opening facing in a first direction parallel to the mounting surface, wherein the power track further comprises a second linear opening facing in a second direction parallel to the mounting surface, which second direction is opposite the first direction, and wherein the first linear opening and the second linear opening are formed by an H-shaped cross-section of the power track.

7. A system according to claim 1, wherein the power track further comprises power track electrodes arranged within the linear opening, and wherein the power track electrodes are recessed compared to the linear light source arranged within the linear opening and also positioned further from a bottom of the linear opening than the linear light source.

8. A system according to claim 1, wherein the electronic product is a lighting product.

* * * * *